United States Patent [19]
Bocchicchio et al.

[11] Patent Number: 5,986,414
[45] Date of Patent: Nov. 16, 1999

[54] CONFIGURABLE LIGHT OUTPUT CONTROLLER, METHOD FOR CONTROLLING LIGHTS AND A SYSTEM FOR IMPLEMENTING THE METHOD AND INCLUDING A CONFIGURABLE LIGHT OUTPUT CONTROLLER

[75] Inventors: Keith A. Bocchicchio, Elizabethtown; Joseph M. Bowling, Carlisle, both of Pa.

[73] Assignee: Synergistech, Inc., Lewisberry, Pa.

[21] Appl. No.: 08/890,456

[22] Filed: Jul. 9, 1997

[51] Int. Cl.⁶ ................................................. H05B 37/00
[52] U.S. Cl. ....................... 315/312; 315/318; 356/237.1; 348/721
[58] Field of Search ...................... 315/312, 318, 315/307, 151, 158, 292, 294; 356/239, 237.1, 147, 376; 348/126, 719, 721

[56] References Cited

U.S. PATENT DOCUMENTS

| | | | |
|---|---|---|---|
| 4,855,830 | 8/1989 | Davis et al. | 358/168 |
| 4,882,498 | 11/1989 | Cochran et al. | 250/571 |
| 5,078,496 | 1/1992 | Parker et al. | 356/371 |
| 5,090,804 | 2/1992 | Wong et al. | 356/237 |
| 5,095,204 | 3/1992 | Novini | 250/223 B |
| 5,102,227 | 4/1992 | Zwirner et al. | 356/384 |
| 5,305,012 | 4/1994 | Faris | 345/7 |
| 5,311,598 | 5/1994 | Bose et al. | 382/8 |
| 5,515,159 | 5/1996 | Sites et al. | 356/237 |
| 5,519,496 | 5/1996 | Borgert et al. | 356/394 |

*Primary Examiner*—Haissa Philogene
*Attorney, Agent, or Firm*—Michaelson & Wallace; Peter L. Michaelson

[57] ABSTRACT

A device and method for generating output trigger signals, for firing one or more light sources, from input trigger signals generated by a vision processor. The input trigger signals are first accepted from the vision processor. Next, output triggers are determined, in response to the input trigger signals, based on a stored lighting program. Finally the output trigger signals are generated based on the determined output triggers.

21 Claims, 13 Drawing Sheets

| INPUT TRIGGER GROUP | SEQUENCE(S) SEQUENCE | S1 | S2 | S3 | S4 | S5 | S6 | S7 | S8 | SL1 | SL2 | SL3 | SL4 |
|---|---|---|---|---|---|---|---|---|---|---|---|---|---|
| 1 | 1 | 0 | 0 | 1 | 0 | 0 | 0 | 1 | 0 | 0 | 0 | 0 | 0 |
| 1 | 2 | 0 | 0 | 0 | 0 | 0 | 0 | 0 | 0 | 0 | 0 | 0 | 0 |
| 1 | 3 | 0 | 0 | 0 | 0 | 0 | 0 | 0 | 0 | 0 | 0 | 1 | 0 |
| 2 | 1-5 | 0 | 0 | 0 | 1 | 0 | 1 | 0 | 0 | 0 | 0 | 0 | 0 |
| 2 | 6-10 | 0 | 0 | 1 | 0 | 1 | 0 | 0 | 0 | 1 | 0 | 0 | 0 |
| 4 | 1 | 0 | 0 | 0 | 0 | 1 | 0 | 0 | 0 | 0 | 0 | 0 | 0 |
| 4 | 2 | 0 | 0 | 0 | 0 | 0 | 1 | 0 | 1 | 0 | 0 | 0 | 0 |
| 4 | 3 | 1 | 0 | 0 | 0 | 0 | 0 | 0 | 0 | 0 | 1 | 0 | 0 |
| 4 | 4 | 1 | 0 | 0 | 0 | 0 | 0 | 0 | 0 | 0 | 0 | 0 | 0 |

CONFIGURABLE LIGHT OUTPUT CONTROLLER, METHOD FOR CONTROLLING LIGHTS AND A SYSTEM FOR IMPLEMENTING THE METHOD AND INCLUDING A CONFIGURABLE LIGHT OUTPUT CONTROLLER

BACKGROUND OF THE INVENTION a. Field of the Invention

The present invention concerns a lighting system, and in particular, a lighting system for use with a machine vision system for inspecting parts.

b. Related Art

Machine vision is becoming an integral part of automation. Manual inspection of part attributes, is becoming impractical, even at low manufacturing output levels. This is because manual part inspection is subjective, time consuming, and expensive. Automated inspection systems employing machine vision overcome many of the drawbacks of manual part inspection.

However, to optimize machine vision inspection systems, the part being inspected must be properly lit. Strobe lights are often used as light sources for machine vision inspection system. When such strobe lights are properly installed and controlled, illumination of the part being inspected is optimized such that an image capturing means of the machine vision inspection system may capture a good, clean image of the part. Further, different parts, or different sections of a particular part, may require different lighting (e.g., back lighting, ring lighting, strobe lighting, etc.) such that an optimal image is captured. Moreover, it may be necessary to capture multiple images of a particular part.

Basically, known systems adapt to changing lighting conditions in one of three ways; namely (i) controlling the intensity of a light source, (ii) controlling light rays propagating towards an image capturing means, or (iii) adjusting a thresholding level applied to a captured image.

For example, U.S. Pat. No. 4,855,830 ("the Davis patent") discusses a method in which the effects of changes in the light level are compensated for by (i) measuring the luminance of a captured image, (ii) setting a threshold As based on the measured luminance, and (iii) processing the image using the threshold. Similarly, U.S. Pat. No. 5,311,598 ("the Bose et al patent") adjusts a threshold based on pixel intensity of a captured image. Unfortunately, the methods discussed in these patents are limited to the manner in which a captured image is processed. The image initially captured is not improved by these methods.

U.S. Pat. No. 5,305,012 ("the Faris patent") discusses an electro-optical system having an optical surface formed from addressable pixels having controllable light transmitting characteristics. The light transmitting characteristics of certain pixels are modulated to modulate the intensity of light rays propagating through the electro-optical system towards an image capturing means. Unfortunately, this system is relatively complex, and yet does not improve the quality of the light initially reflected from the image.

Lastly, U.S. Pat. No. 5,078,496 ("the Parker et al patent") discusses a surface quality detection system in which the light intensity of a light source is controlled to maintain substantially constant light intensity. This is done by controlling the light exposure with a shutter or by pulsing the light based on the output of a photoresistor such that the light intensity is controlled in a closed loop. Unfortunately, this control of the light source is relatively simple and is not easily adaptable for optimally lighting different parts or different areas of a given part.

To maximize the use of a machine vision inspection system, the system should be adaptable for inspecting a number of different parts and a number of different features of a given part. However, the different parts and different features of a given part will often require different types of lighting to provide a good, clean image to the image capturing means of the machine vision inspection system. Thus, a flexible, easily configurable lighting system is needed.

SUMMARY OF THE INVENTION

The present invention provides a device for use in a flexible, easily configurable lighting system. The device generates output trigger signals in response to received input trigger signals based on a stored lighting program. The device includes an input/output interface and a control unit. The input/output interface receives the input trigger signals and generates the output trigger signals. The control unit stores the lighting program and determines output signals, upon which the output trigger signals are based, in response to the input trigger signals based on the stored lighting program.

The input trigger signals may belong to input trigger groups. Each of the output signals may be based, in part, on one of the input trigger groups to which one of the input trigger signals belongs. Each of the input trigger groups may include a sequence of input trigger signals. Each of the output signals may be based, in part, on a sequence number of the input trigger signals.

The input/output interface may include a control program interface for accepting a lighting program from an external source and/or for providing the stored lighting program to an external source.

The control unit may include a storage device for storing the lighting program, a controller input/output interface for communicating with the input/output interface, and a processor for executing the stored lighting program in response to the input trigger signals.

The present invention also provides a flexible, easily configurable lighting system which includes a vision processor, a light source, an external source, and a configurable light output controller. The vision processor generates trigger input signals. The light source is fired in response to a received trigger output signal. The external source provides a lighting program. The configurable light output controller has an input interface, an output interface, a storage device, and a processor. The input interface is coupled with the vision processor and receives the trigger input signals generated by the vision processor. The output interface is coupled with the light source and provides the trigger output signal to the light source. The storage device stores the lighting program. The processor executes the lighting program to generate the trigger output signal in response to the trigger input signals received by the input interface.

The trigger input signals may belong to input trigger groups. The trigger output signal may be based, in part, on one of the input trigger groups to which one of the trigger input signals belongs. Each of the input trigger groups may include a sequence of trigger input signals. The trigger output signal may be based, in part, on a sequence number of the one of the trigger input signals.

The configurable light output controller may further include a control program interface for accepting a lighting program from the external source. The control program interface may provide the stored lighting program to the external source. The external source may be a program input terminal or a computer such as a personal computer. The program input terminal may include a lighting program generation application. The lighting program generation application may present a template for creating and/or editing a lighting program.

Each of the trigger signals generated by the vision processor may be assigned to one of a plurality of links to the configurable light output controller, such that each of the links provides a sequence of trigger signals. The lighting program may specify an output trigger signal set based on the links upon which a trigger signal is provided and based on a sequence number of the trigger signal. The links may be physically distinct links such that the trigger signals generated by the vision processor are space division multiplexed onto the plurality of physically distinct links. Otherwise, the plurality of links may be defined as distinct time slots on a single physical link such that the trigger signals generated by the vision processor are time division multiplexed onto the single physical link. Alternatively, the plurality of links may be defined as distinct frequency bands on a single physical link such that the trigger signals generated by the vision processor are frequency division multiplexed onto the single physical link.

The present invention also provides a method for generating output trigger signals, for firing one or more light sources, from input trigger signals generated by a vision processor. The method includes steps of: (a) accepting the input trigger signals from the vision processor; (b) determining output triggers in response to the input trigger signals based on a stored lighting program; and (c) generating the output trigger signals based on the determined output triggers.

Each of the input trigger signals may be assigned to a particular one of a plurality of trigger groups such that each of the plurality of trigger groups may be provided with a sequence of input trigger signals.

The step of determining output triggers may include sub-steps of: (i) determining the trigger group to which a received input trigger signal belongs; (ii) determining a sequence number of the received input trigger signal within the trigger group; and (iii) determining an output trigger group based on the trigger group and based on the determined sequence number.

BRIEF DESCRIPTION OF THE DRAWINGS

FIG. 3B is a command line listing of an exemplary lighting program used by the configurable light output controller of FIG. 2.

DETAILED DESCRIPTION

The present invention concerns a novel lighting method and lighting system. The following description is presented to enable one skilled in the art to make and use the invention, and is provided in the context of a particular application and its requirements. Various modifications to the preferred embodiment will be apparent to those skilled in the art, and the general principles set forth below may be applied to other embodiments and applications. Thus, the present invention is not intended to be limited to the embodiment shown.

Figure 1:
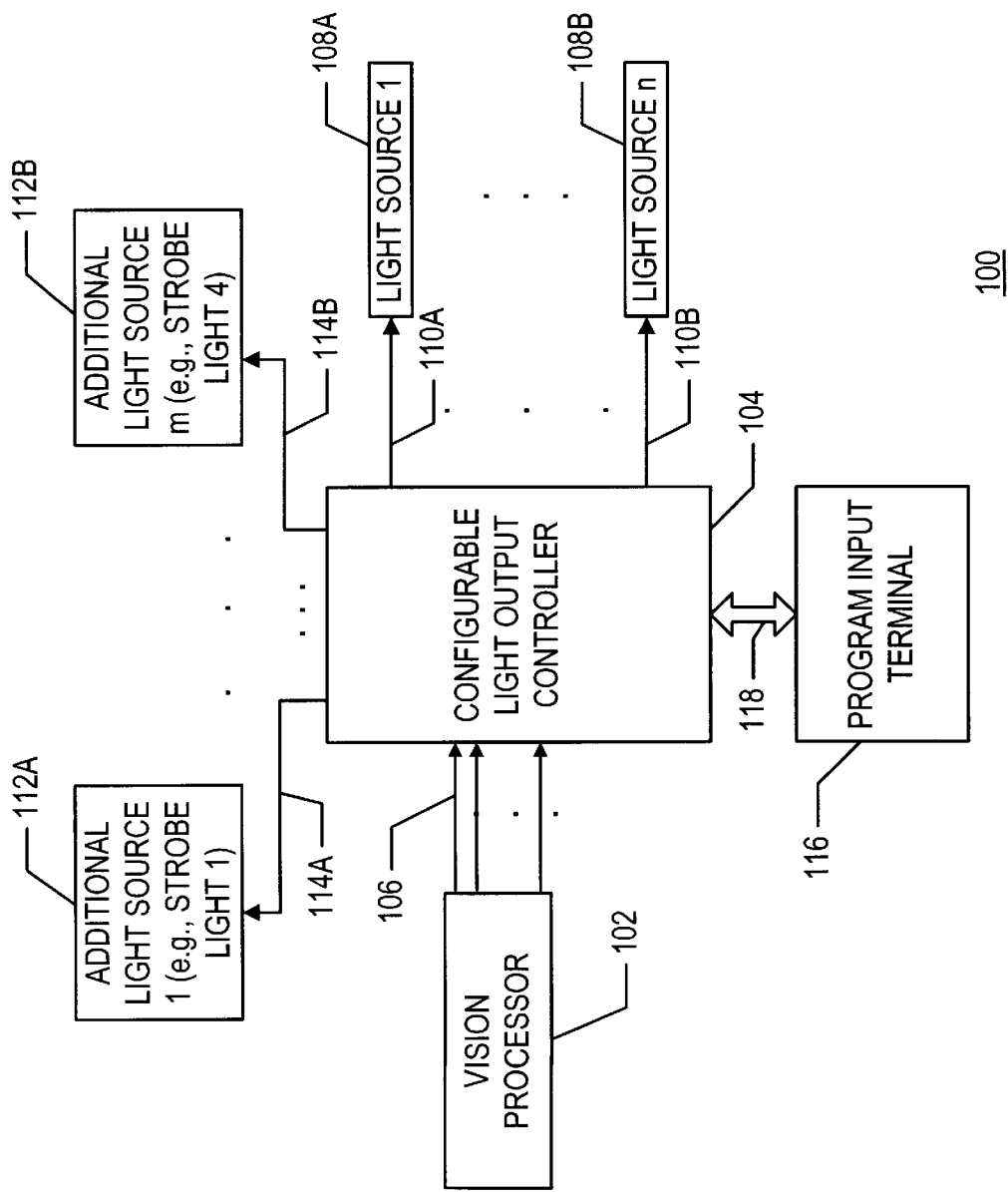
FIG. 1 is a high level block diagram of a configurable lighting system which includes the configurable light output controller of the present invention.

FIG. 1 is a high level block diagram of a configurable lighting system 100 which includes the configurable light output controller 104 of the present invention. Basically, the configurable lighting system 100 functions to illuminate a part or a section of a part to be inspected ("the inspected element"), to capture an image of the inspected element, and to process the captured image. More specifically, one or more light sources 108 are triggered by trigger command signal(s) provided by the configurable light output controller 104, via links 110, to illuminate the inspected element. Additional light sources 112, such as strobe lights for example, may be triggered by trigger command signal(s) provided by the configurable light output controller, via link(s) 114. Image capturing means (not shown), such as a camera(s) for example, capture image(s) of the inspected element. An image processing means (not shown) performs image processing functions on the captured images. The vision processor 102 generates trigger signals which indicate that the inspected element is ready for inspection (e.g., the inspected element is positioned such that it may be lit by light sources 108 and/or further light sources 112 and such that its image may be captured).

The light sources 108 may be part number MVS2020 High Intensity Strobe Pack sold by EG&G Inc., for example. The additional light sources 112 may be strobe packs sold by PPT Vision, Inc.

More specifically, the configurable light output controller 104 receives one or more trigger input signals from the vision processor 102 via link(s) 106. For each of the trigger input links 106, the configurable light output controller 104 may include one or more stored sequence(s) of lighting commands. Thus, each of the links 106 communicates a sequence of triggers of an input trigger group. Although a number of links 106 are shown in FIG. 1, a number of input trigger groups may be communicated over a single link, for example, in a time-division or frequency-division multiplexed manner. The lighting commands, which are explained in more detail below, determine which of the light sources 108 and/or additional light sources 112 are to be triggered in response to a received input trigger signal.

The stored sequences of lighting commands (or "lighting program") are created with the program input terminal 116, which may be a keypad, dumb terminal, or a personal computer for example. For example, the terminal emulation program supplied with MicroSoft, Inc. Windows™ can be used to enter the lighting program. In this case, the communications parameters should be set as follows: Baud Rate=9600; Parity=None; Stop Bits=1; Data Bits=8; Flow Control=XON/XOFF; Local Echo=ON; and Inbound Carriage Return/Line feed=ON. A lighting program created by the program input terminal 116 may be provided to the configurable light output controller via link 118, such as an RS232 compliant link for example. The program input terminal may include peripheral storage devices for storing one or more lighting programs.

Figure 2:
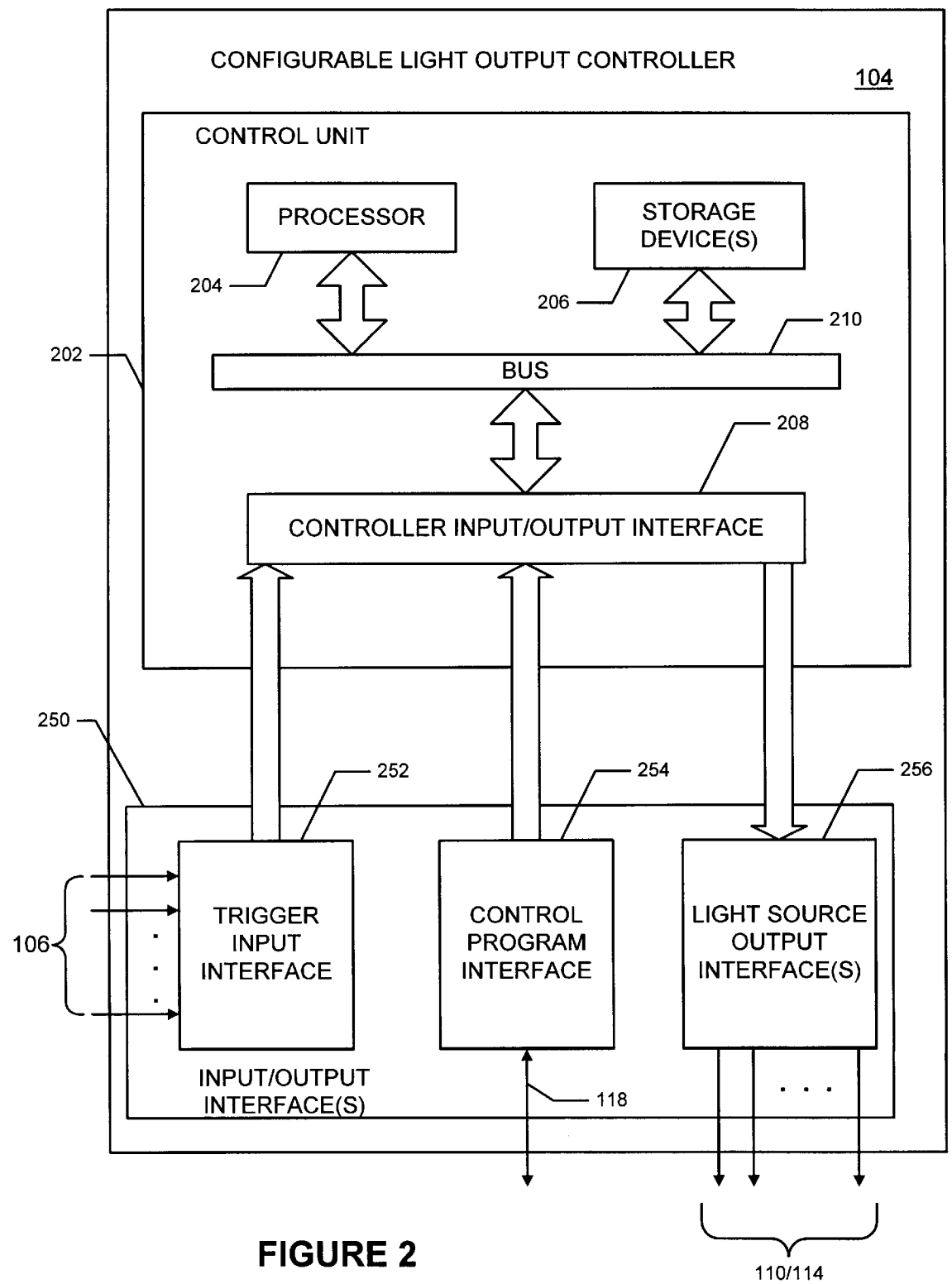
FIG. 2 is a high level block diagram of a preferred embodiment of the configurable light output controller of the present invention.

FIG. 2 is a high level block diagram of a preferred embodiment of the configurable light output controller 104 of the present invention. The details of the preferred embodiment of the configurable light output controller 104 will be described later with reference to FIG. 5. As shown in FIG. 2, the configurable light output controller 104 basically includes a control unit 202 and input/output interfaces 250. The configurable light output controller 104 functions to (i) accept and store a lighting program from the program input terminal 116, (ii) accept input triggers (e.g., as sequences of triggers belonging to input trigger groups) from the vision processor 102, (iii) determine output triggers (e.g., defined by output trigger sets) in response to received input triggers based on the stored lighting program, and (iv) output trigger signals based on the determined output triggers.

As shown in FIG. 2, the input/output interfaces 250 may include a trigger input interface 252 which terminates the link(s) 106 from the vision processor 102, a control program interface 254 which terminates a link 118 from the program input terminal 116, and one or more light source output interface(s) 256 for providing trigger signals to the light source(s) 108 and/or further light source(s) 112 via link(s) 110 and/or 114.

The control unit 202 includes a controller input/output interface 208 which facilitates communication with the input/output interfaces 250. The control unit 202 further includes a processor 204 and storage device(s) 206. The storage device(s) 206 preferably include volatile memory, such as RAM and cache for example, and non-volatile memory such as ROM. A bus system 210 is shared by the processor 204, the storage devices 206, and the controller input/output interface 208. Although not shown, the processor 204 may include dedicated storage which is accessible without the system bus 210.

At a high level, the configurable light output controller 104 operates as follows. A lighting program, created on the program input terminal 116, is provided to the configurable light output controller 104 via link 118. The control program interface 254 passes the lighting program to the control input/output interface 208 which interrupts the processor 204. The processor 204 then loads the lighting program, via system bus 210, to storage device(s) 206 (e.g., to memory). The configurable light output controller 104 is now ready for lighting operations. Trigger signals, generated by the vision processor 102, are provided to the configurable light output controller 104 via link(s) 106. The trigger input interface unit 252 passes the trigger inputs to the controller input/output interface 208. In response to the received trigger inputs, the processor 204 generates trigger output signals based on the stored lighting program. The trigger output signals are provided, via the controller input/output interface 208 to the light source output interface(s) 256. The light source output interface(s) 256 generate strobe trigger signals which are provided to light source(s) 108 and/or further light source(s) 112 via link(s) 110 and/or links 114.

Figure 3A:
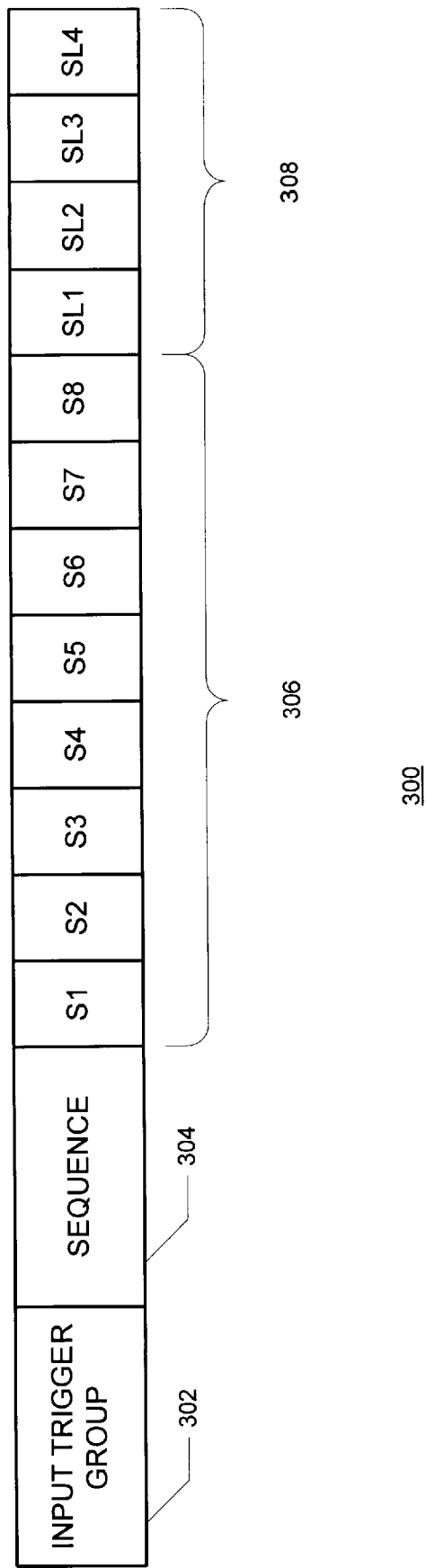
FIG. 3A is an exemplary format of a command line used in a lighting program used by the configurable light output controller of FIG. 2.

FIG. 3A is an exemplary format of a command line 300 used in a lighting program used by the configurable light output controller 104 of FIG. 2. Generally, the format of the command line 300 and the range of acceptable values for each field of the command line 300 will depend on the number trigger links 106 (or more specifically, the number of input trigger groups) from the vision processor 102 and the number of light source(s) 108 and further light source(s) 112. In the following example, it will be assumed that the system 100 includes four (4) trigger links 106 from the vision processor 102, eight (8) light sources 108, and four (4) strobe lights as the additional light sources 112. In this example, the command line 300 includes a trigger field 302, a sequence field 304, a light source trigger field 306, and a strobe light trigger field 308.

The trigger field 302 associates the command line 300 to one (1) of the four (4) trigger links (or more specifically, input trigger groups) 106 from the vision processor 102 and thus has one (1) of four (4) acceptable values. The sequence field 304 defines a repeating order of the command lines 300. In this example, it will be assumed that each sequence has a maximum of ten (10) command lines 300 and thus the sequence field has one (1) of ten (10) acceptable values. Each of the eight (8) fields, S1 through S8, of the light source trigger field 306 determines whether or not a corresponding one of the eight (8) light sources 108 will be fired. Accordingly, each of the eight (8) fields of the light source trigger field 306 has one of two (2) acceptable values; one value corresponding to a fire command, and the other value corresponding to a no-fire command. Similarly, each of the four (4) fields, SL1 through SL4, of the strobe light trigger field 308 determines whether or not a corresponding one of the four (4) strobe lights 112 will be fired. Accordingly, each of the four (4) fields of the strobe light trigger field 308 has one of two (2) acceptable values; one value corresponding to a fire command, and the other value corresponding to a no-fire command.

Figure 4A:
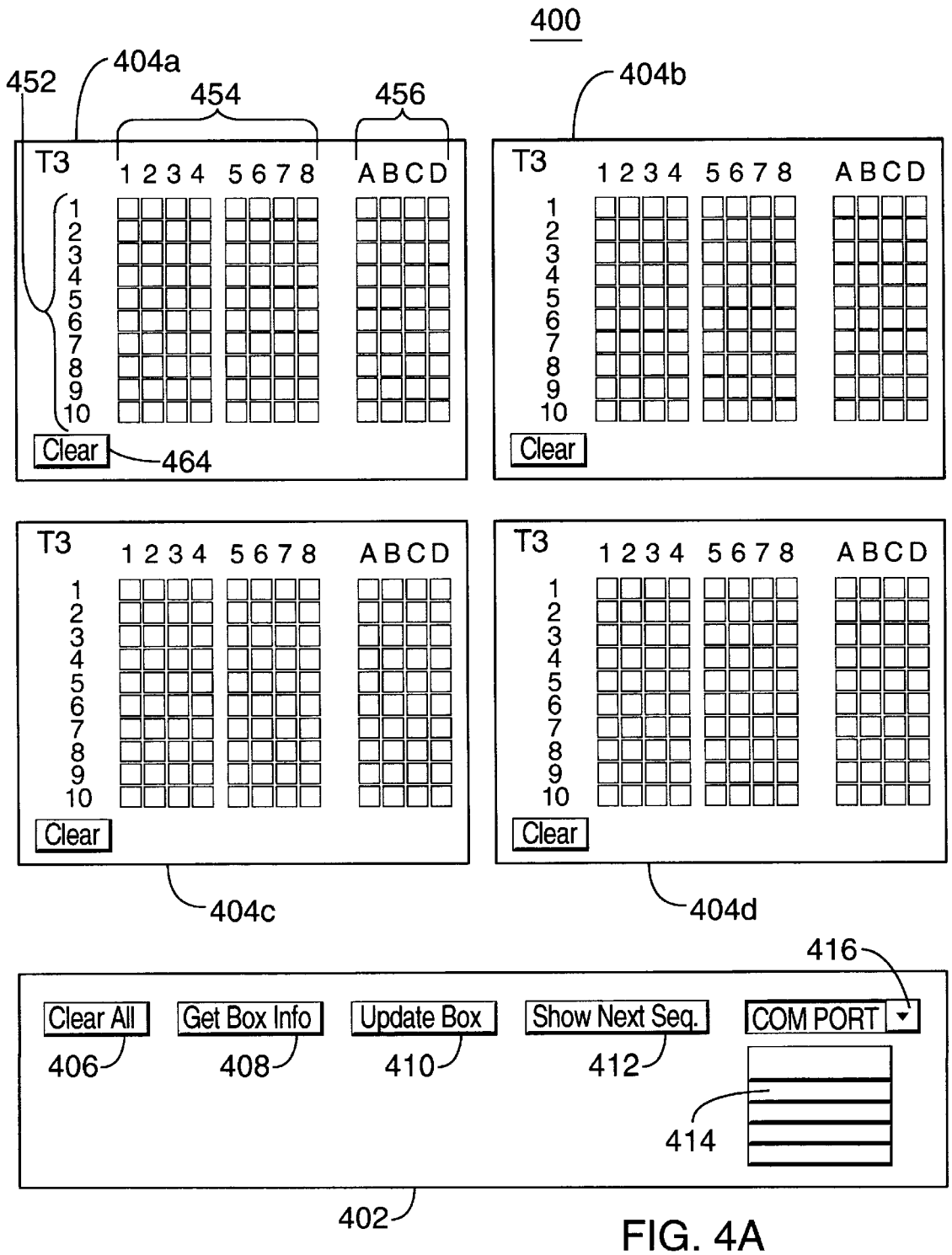
FIG. 4A is a graphical user interface illustrating a programming template for generating and editing a lighting program used by the configurable light output controller of FIG. 2.

FIG. 4A is a graphical user interface illustrating a programming template 400 for generating and/or editing a lighting program for controlling the configurable light output controller 104 of FIG. 2. In the following, it is assumed that the program input terminal 116 is a personal computer having a Windows™-based operating system and an application for generating and/or editing a lighting program. Although one skilled in the art of computer programming could create a lighting program application, based on the disclosed template 400, without undue experimentation, an exemplary lighting program application is attached as Appendix A. As was the case with the example discussed with reference to FIG. 3A, it will be assumed that the system 100 includes four (4) trigger lines 106 (or more specifically, input trigger groups) from the vision processor 102, eight (8) light sources 108, and four (4) strobe lights 112, and that the maximum number of repeatable sequence steps is ten (10). As shown in FIG. 4A, the programming template 400 includes a command bar 402 and four (4) trigger boxes 404. Each of the four (4) trigger boxes 404 corresponds to one of the four (4) links 106 (or more specifically, input trigger groups) from the vision processor 102.

Since the format of each of the four (4) trigger boxes 404 is the same, only the format of the first trigger box 404a will be described. As shown in FIG. 4, the trigger box 404a includes ten (10) sequences 452. Each of the ten (10) sequences 452 includes eight (8) boxes 454 corresponding to the eight (8) light sources 108 and four (4) boxes 456 corresponding to the four (4) strobe lights 112.

When the "Clear All" command button 406 is activated (for example by double clicking a mouse button when a cursor touches the button), the template 400 is cleared. On the other hand, when a "Clear" button 464 of a particular box 404 is activated, only that particular box 404 is cleared. When the "Get Box Info" command button 408 is activated, the lighting program currently stored in the memory 206 of the configurable light output controller 104 is read and provided to the program input terminal 116. The lighting program is then displayed on the template 400. Alternatively, a similar command button may be used to present the user with file names of previously programmed templates stored at the program input terminal 116. When the user selects one of the file names, the previously programmed template is displayed for editing. When button 416 is activated, a drag down menu 414 is presented which allows the user to specify the communications port of the program input terminal 116 coupled with the configurable light output controller 104. Other drag down menus (not shown) may be provided to permit the user to select other templates 400' (e.g., for systems 100' having different numbers of trigger links 106, light sources 108, strobe lights 112, and/or sequence steps). When a box 404 is activated (e.g., by double clicking a mouse button when a cursor is within the box 404 or by activating the update box command button 410), a last programmed sequence step 452 in the box 404 is highlighted. By clicking boxes 454/456 of the active sequence line, trigger values can be set on or off. When the "Update Box" command button 410 is activated, the lighting program shown on the template 400 is loaded into the memory 206 of the configurable light output controller 104.

The user can also monitor the actions of the configurable light output controller 104 in response to input trigger signals on link(s) 106. In general, the last sequence 452 programmed within a trigger box 404 is denoted with a box of a first color (e.g., yellow). Each time an input trigger signal is provided on a particular one of the link(s) 106 (or more specifically, of one of the input trigger groups), the next sequence 452 is stepped to. Once the last sequence 452 is reached, the first sequence 452 is next. The next sequence 452 is denoted with a second color (e.g., blue). When the "Show Next Seq" command button 412 is activated, the last sequence 452 is incremented.

Figure 4B:
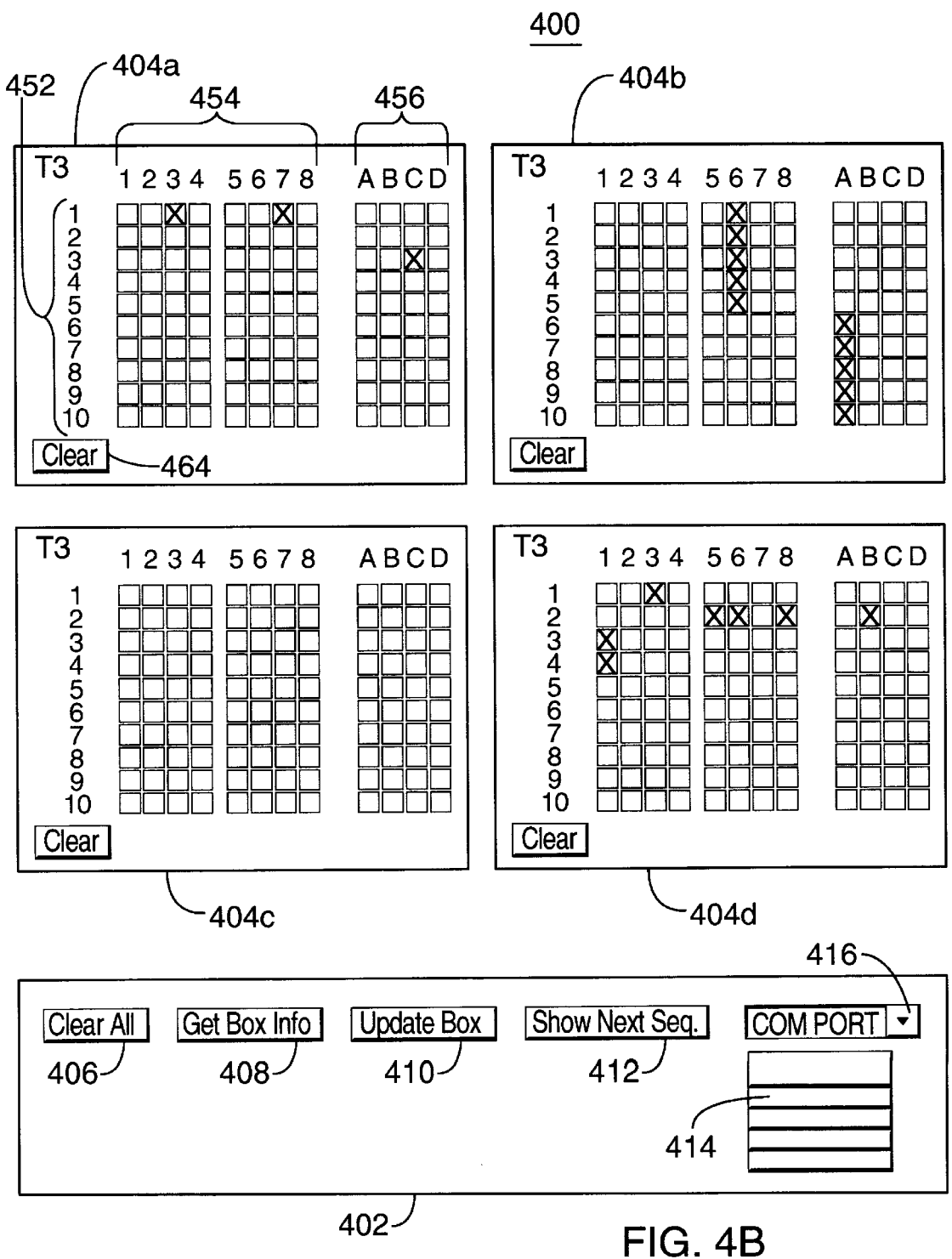
FIG. 4B is an example of a lighting program entered onto the programming template of FIG. 4A.

FIG. 4B illustrates a programmed template 400'. As shown in box 404a, a first input trigger signal on a first of the links 106 (or more specifically, of a first of the input trigger groups) from the vision processor 102 will cause the configurable light output controller 104 to trigger a third and a seventh of the eight (8) light sources 108. A second input trigger signal on the first of the links 106 (or more specifically, of a first of the input trigger groups) causes no action. Finally, a third input trigger signal on the first of links 106 (or more specifically, of a first of the input trigger groups) will cause the configurable light output controller 104 to trigger a third of four (4) strobe lights 112. Since sequences 4 through 10 are not programmed, sequences 1 through 3 will repeat in response to subsequent input trigger signals on the first of the links 106 (or more specifically, of a first of the input trigger groups).

As shown in box 404b, each of the first five (5) input trigger signals received from a second of the links 106 (or more specifically, of a second of the input trigger groups) from the vision processor 102 will cause the configurable light output controller 104 to trigger a sixth one of the eight (8) light sources 108. Each of the next five (5) input trigger signals received from the second of the links 106 (or more specifically, of a second of the input trigger groups) will cause the configurable light output controller to trigger a first one of the four (4) strobe lights 112.

As shown in box 404c, any input trigger signals on a third of the links 106 (or more specifically, of a third of the input trigger groups) from the vision processor 102 will cause no action. Finally, as shown in box 404d, a first input trigger signal on a fourth of the links 106 (or more specifically, of a third of the input trigger groups) will cause the configurable light output controller 104 to trigger a third one of the eight (8) light sources 108. A second input trigger signal on the fourth of the links 106 (or more specifically, of a third of the input trigger groups) will cause the configurable light output controller 104 to trigger the fifth, sixth, and eighth ones of the eight (8) light sources 108, as well as the second one of the four (4) strobe lights 112. Each of a third and fourth input trigger signals on the fourth of the links 106 (or more specifically, of a third of the input trigger groups) will cause the configurable light output controller 104 to trigger the first one of the eight (8) light sources 108.

FIG. 3B is a command line list 350 of a lighting program corresponding to the one described above with reference to FIG. 4B.

As can be seen from the above example, many different lighting sequences can be easily programmed and controlled by the lighting system 100 of the present invention.

Figure 5A:
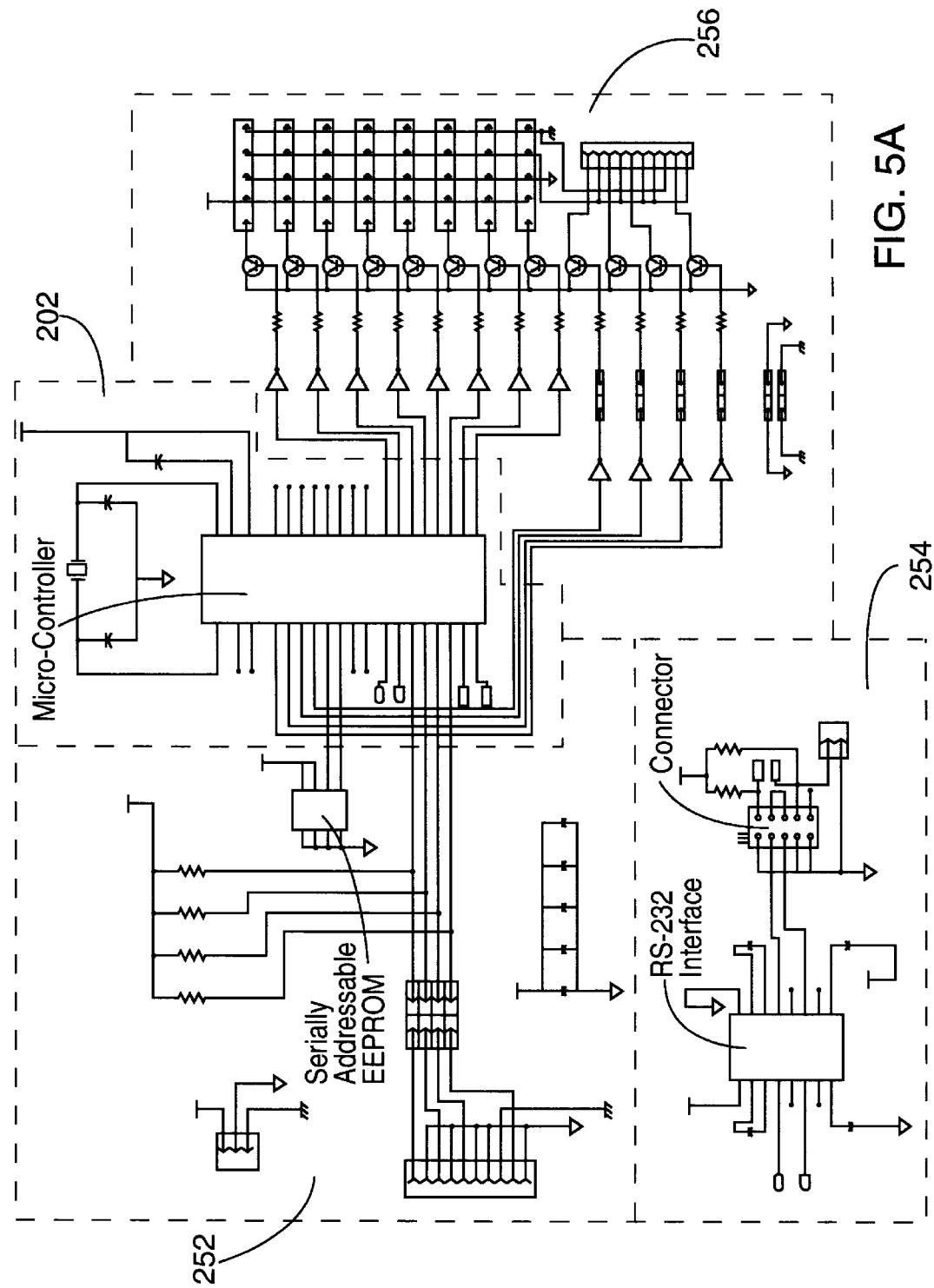
FIG. 5A is a schematic diagram of a preferred embodiment of the configurable light output controller of the present invention.

FIG. 5A is a schematic diagram of a preferred embodiment of the configurable light output controller 104 of the present invention. Referring to FIGS. 5A and 5C, pins A, C, E, and I of chip J10 terminate links 106. Pins B, D, F, G and J of chip J10 are coupled with system ground. Thus, if the emitter and collector of a transistor (not shown) of an output stage of the vision processor 102 are coupled with pins A and B of chip J10, a 5 V input signal is applied to chip U1 when the transistor is opened and a 0 V (or ground) input signal is applied to chip U1 when the transistor is closed. Accordingly, the trigger input interface 252 provides 0 V or 5 V input signals to inputs of chip U1.

Figure 5B:
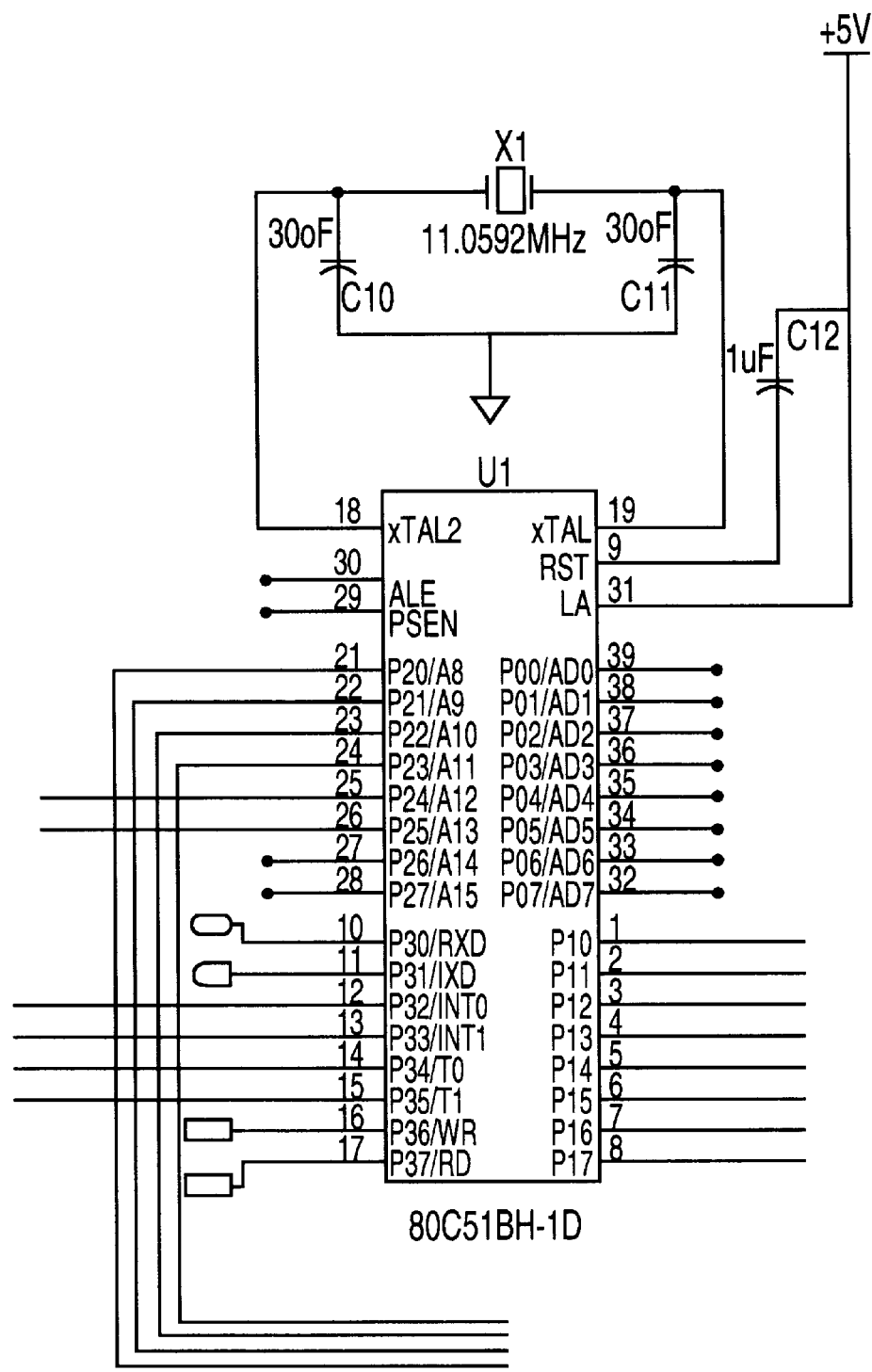
FIG. 5B is an enlarged schematic diagram of the control unit 202.
Figure 5C:
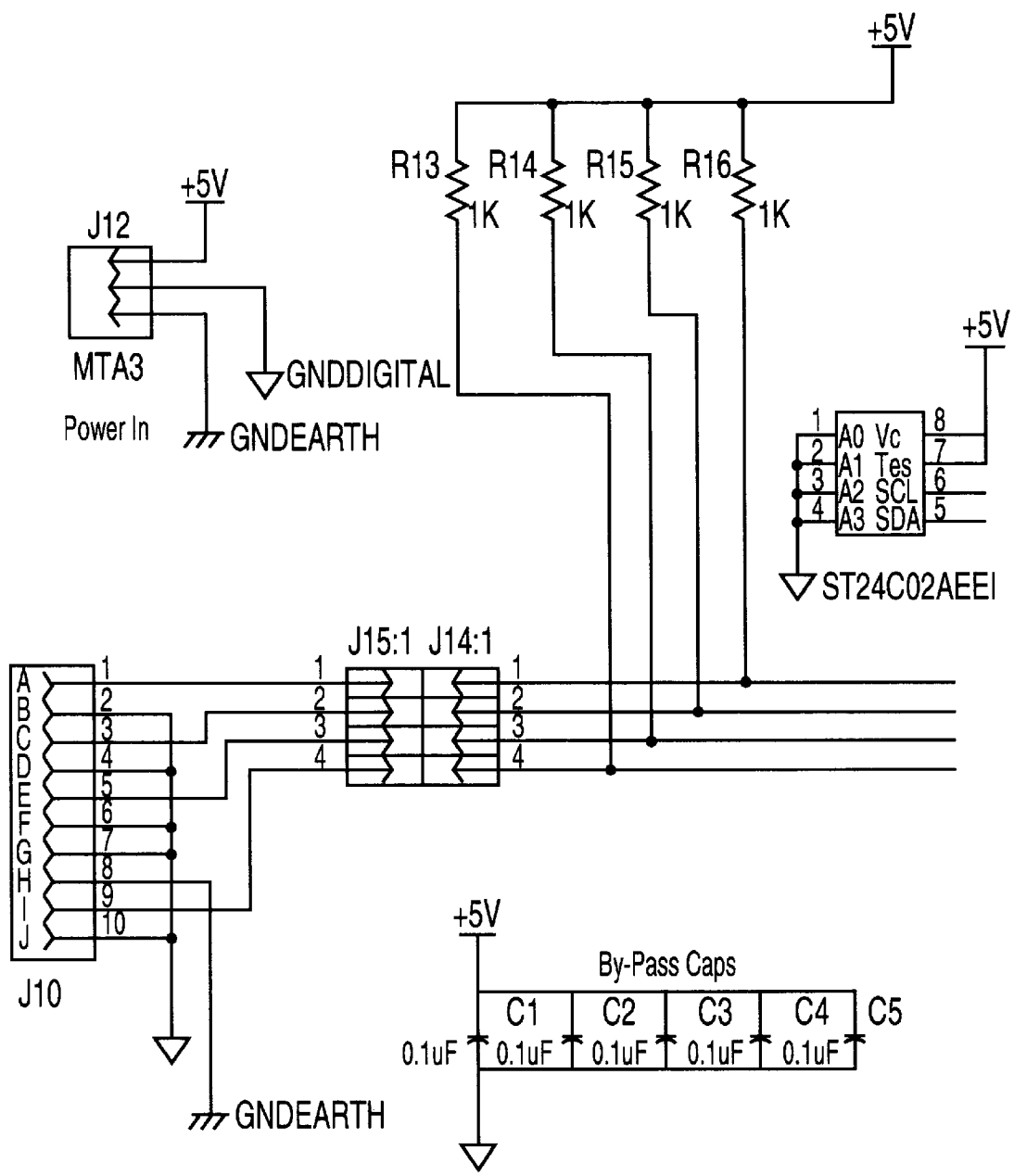
FIG. 5C is an enlarged schematic diagram of the trigger input interface 252.
Figure 5D:
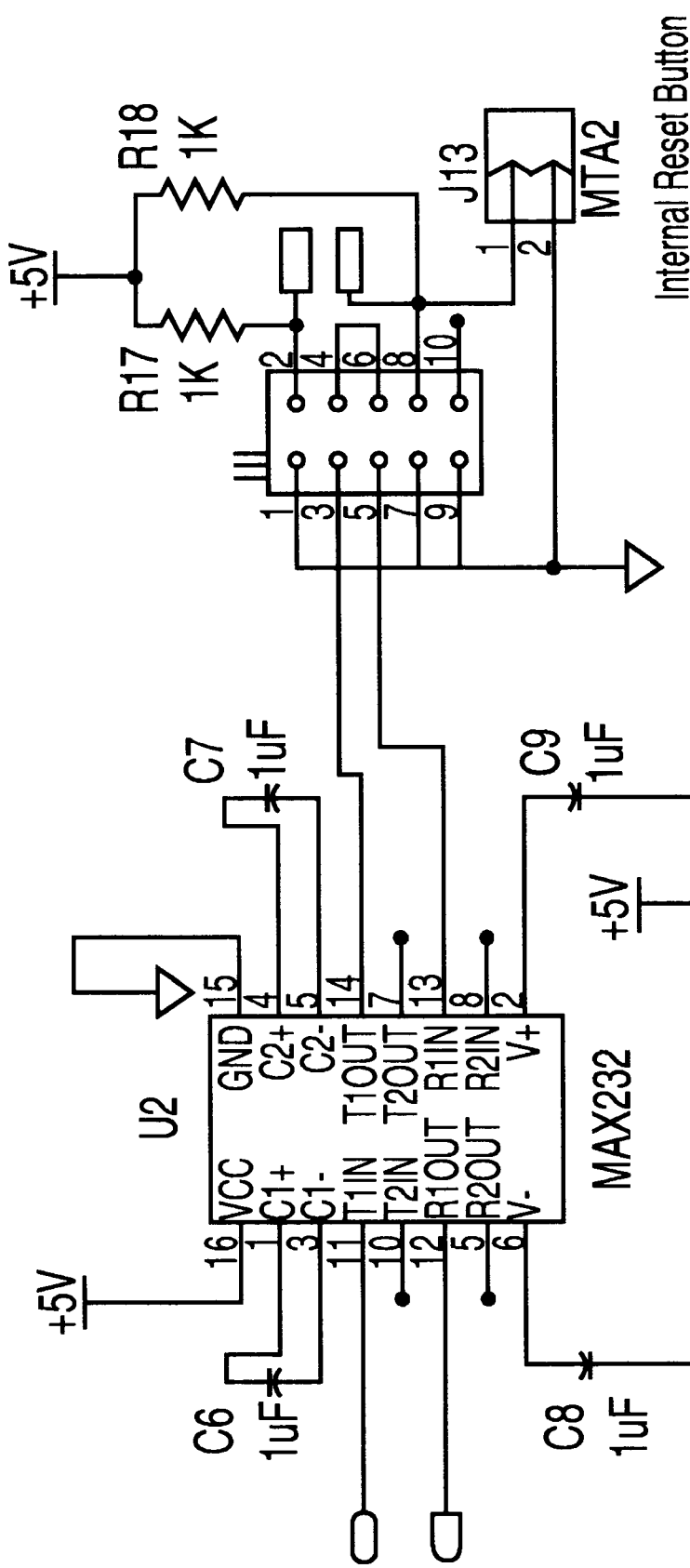
FIG. 5D is an enlarged schematic diagram of the control program interface 254.

Referring to FIG. 5A and 5B, chip U1 is a microcontroller, such as Part No. D87C51FA sold by Intel, and serves as the control unit 202. Referring to FIGS. 5A and 5D, chip U2 provides an RS232 interface which serves as the control program interface 254.

Figure 5E:
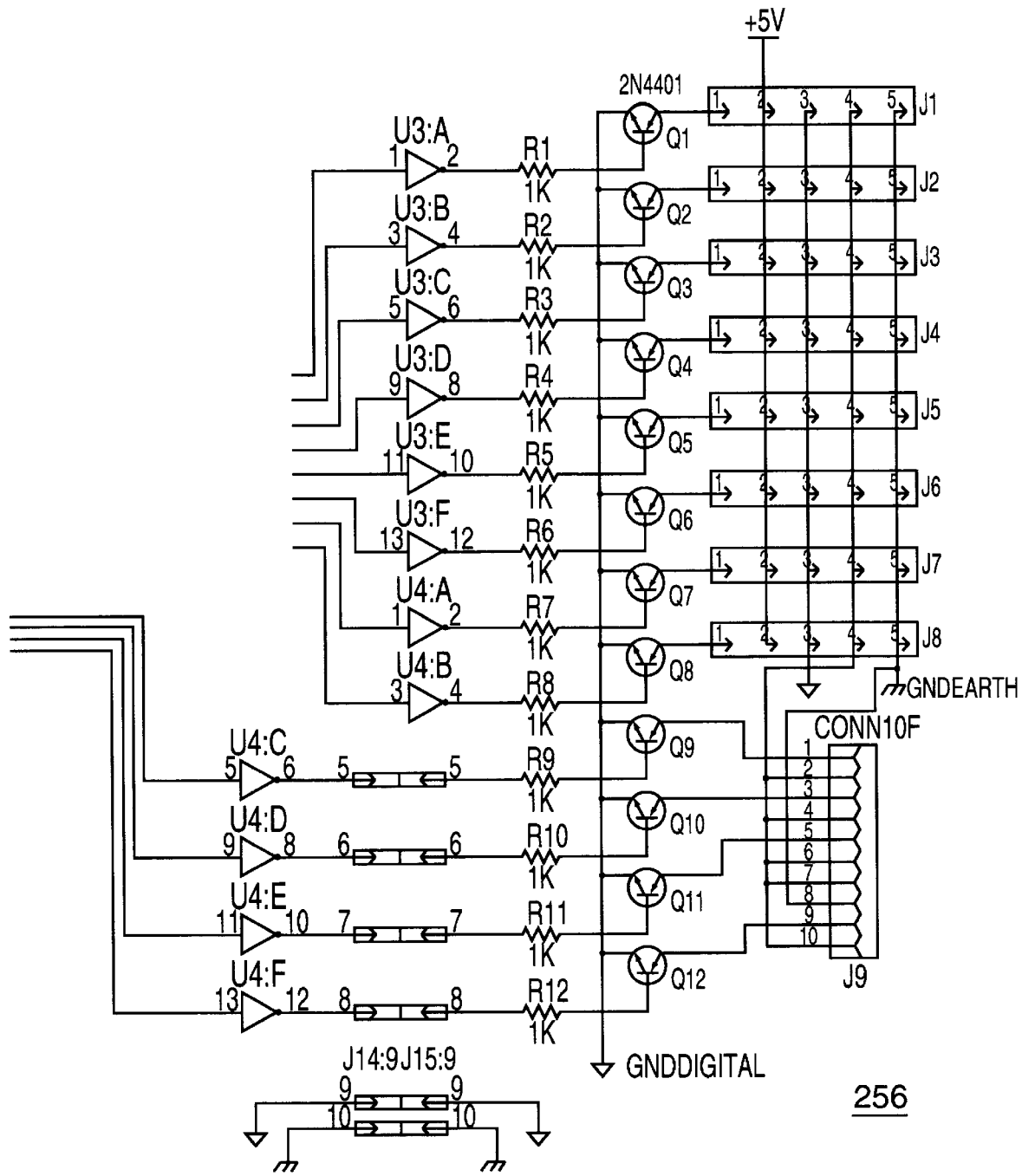
FIG. 5E is an enlarged schematic diagram of the light source output interfaces 256 of FIG. 5A.

Finally, referring to FIGS. 5A and 5E, output signals provided by the micro-controller U1 are provided, via inverting buffers (U3:A through U3:F and U4:A through U4:F) and resistors (R1 through R12) to the bases of open collector transistors (Q1 through Q12). Each of the collectors of transistors Q1 through Q8 are provided to a first pin of a corresponding five pin connector (J1 through J8) and each of the emitters of transistors (Q1 through Q12) are coupled to system ground. As shown in the schematic, in each of the five pin connectors J1 through J8, a second pin is connected with a +5 V source, third and fourth pins are coupled with system common ground, and a fifth pin is coupled with earth ground. The eight buffers (U3:A through U3:F, U4:A, and U4:B), the eight resistors (R1 through R8), the eight transistors (Q1 through Q8) and the eight five-pin connectors (J1 through J8) serve as one of the light source output interfaces 256 which are coupled with light sources 108 via links 110. Each of the collectors of the transistors Q9 through Q12 are provided to pins 1, 3, 5, and 9 of ten pin connector J9. Pins 2, 4, 6, 7, and 10 of the ten pin connector J9 are coupled with system common ground and pin 8 of the ten pin connector J9 is coupled with earth ground. The four buffers (U4:C through U4:F), the four resistors (R9 through R12), the four transistors (Q9 through Q12) and the ten pin connector J9 serve as one of the light source output interfaces 256 which is coupled with further light sources 112 via links 114. The light source output interfaces may use optocoupling devices (not shown) such that they may sink or source current, depending on the requirements of the light sources 108 and further light sources 112.

Figure 6:
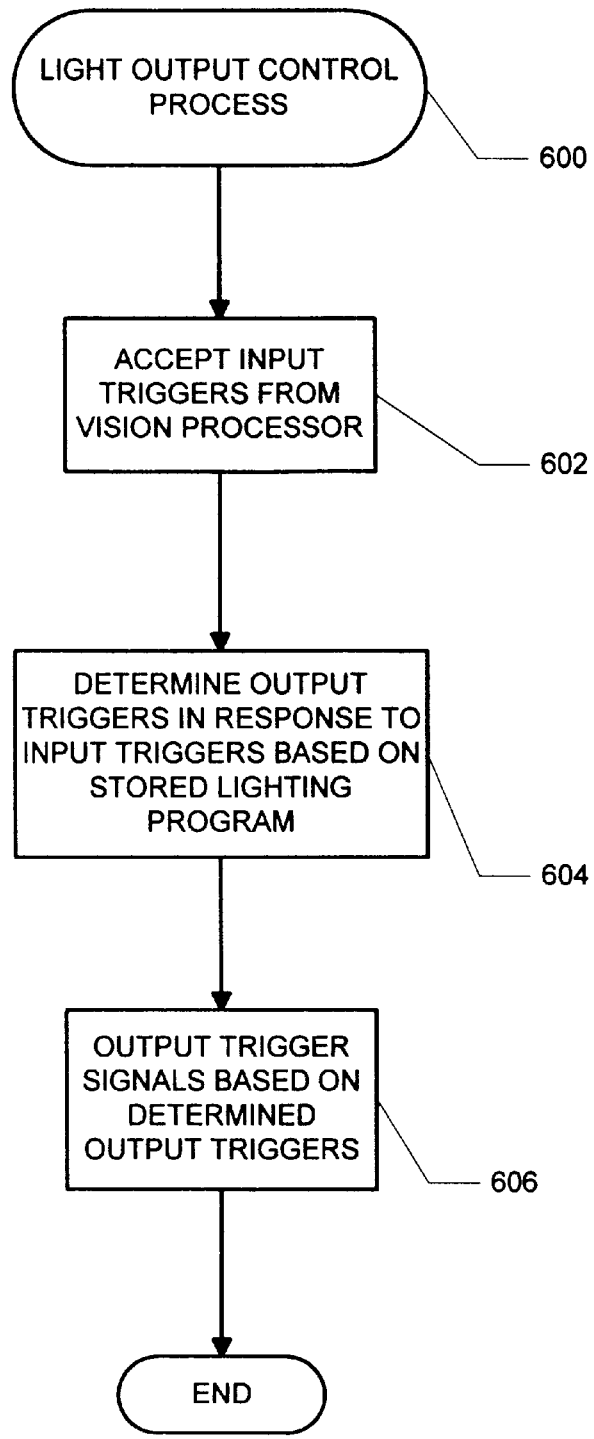
FIG. 6 is a flow diagram of a light output control method of the present invention.

FIG. 6 is a flow diagram of the light output control process 600 of the present invention. First, as shown in step 602, the input triggers from the vision processor are accepted. Referring back to FIG. 2, the trigger input interface 252 which terminates the links 106, as well as the controller input/output interface 208 may used to perform this step. Next, as shown in step 604, output triggers are determined in response to the input triggers based on a stored lighting program. Referring back to FIG. 2, the processor 204, receiving the input trigger signals from the controller input/output interface 208 and operating under the control of a lighting program stored in the storage devices 206, may be used to perform this step. Finally, trigger signals, based on the determined output triggers, are output. Referring back to FIG. 2, this step may be performed by the controller input/output interface 208 and the light source output interface(s) 256.

Figure 7:
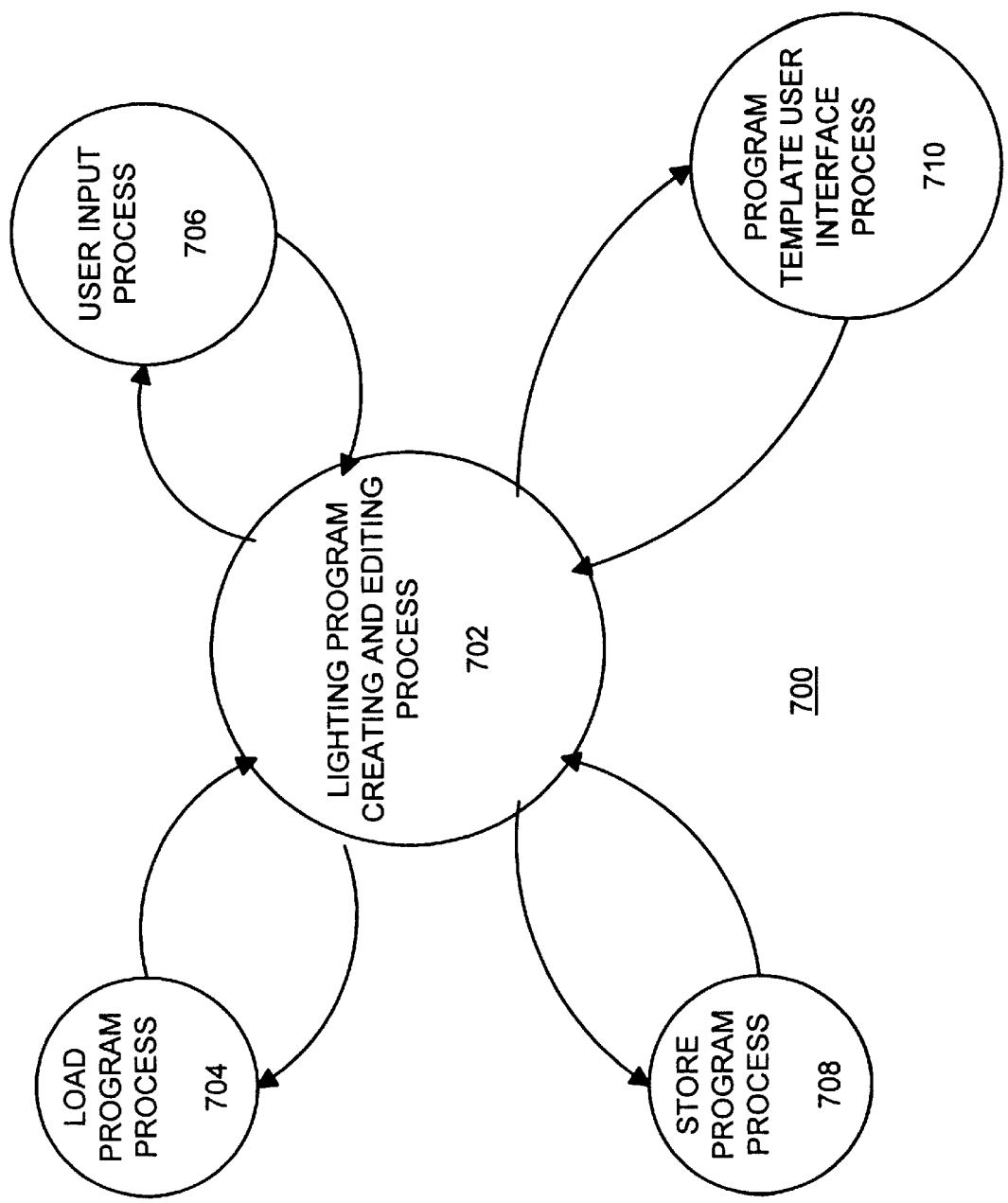
FIG. 7 is a process and data flow diagram of a lighting program generation application which may be used by a program input terminal of the system of FIG. 1.

FIG. 7 is a process and data flow diagram of a lighting program generation application 700 which may be used by a program input terminal 116 of the system of FIG. 1 to allow a user to create and edit lighting programs. The lighting program generation application 700 includes a lighting program creating and editing process 702 which calls other processes. In response to a particular user input, the load program process 704 loads the data of a lighting program stored in the memory of the configurable light output controller 104 to the program input terminal. Referring back to FIG. 4A, the load program process 704 may be invoked when the "Get Box Info" command button 408 is activated. Alternatively, lighting programs stored elsewhere may be downloaded. A program template user interface process 710 may be invoked when a lighting program is loaded or when the lighting program generation process 700 is started. In either case, a template, such as the template 400 shown in FIG. 4A for example, is presented to the user. Once the a blank program template 400 or a program template containing a lighting program downloaded from the configurable light output controller 104 or other storage device is presented, a user input process 706 is invoked upon user inputs and the a lighting program may be created and/or edited. Finally, the store program process 708 stores the data of a lighting program, displayed on the template 400 for example, from the program input terminal 116 to the memory of the configurable light output controller 104. Alternatively, the lighting program may be stored elsewhere. Referring back to FIG. 4A, the store program process 708 may be invoked when the "Update Box" command button 410 is activated.

What is claimed is:

1. A device for generating output trigger signals in response to received input trigger signals based on a stored lighting program, the device comprising:
   a) an input/output interface for receiving the input trigger signals and for generating the output trigger signals; and
   b) a control unit for storing the lighting program and for determining output signals, upon which the output trigger signals are based, in response to the input trigger signals based on the stored lighting program,
   wherein the input trigger signals belong to input trigger groups, and
   wherein each of the output signals is based, in part, on one of the input trigger groups to which one of the input trigger signals belongs.

2. The device of claim 1 wherein each of the input trigger groups includes a sequence of input trigger signals, and
   wherein each of the output signals is based, in part, on a sequence number of the one of the input trigger signals.

3. The device of claim 1 wherein the input/output interface includes a control program interface for accepting a lighting program from an external source.

4. The device of claim 1 wherein the input/output interface includes a control program interface for providing the stored lighting program to an external source.

5. A device for generating output trigger signals in response to received input trigger signals based on a stored lighting program, the device comprising:
   a) an input/output interface for receiving the input trigger signals and for generating the output trigger signals; and
   b) a control unit for storing the lighting program and for determining output signals, upon which the output trigger signals are based, in response to the input trigger signals based on the stored lighting program,
   wherein the control unit includes a storage device for storing the lighting program, a controller input/output interface for communicating with the input/output interface, and a processor for executing the stored lighting program in response to the input trigger signals.

6. A system comprising:
   a) a vision processor for generating trigger input signals;
   b) a light source which fires in response to a received trigger output signal;
   c) an external source for providing a lighting program; and
   d) a configurable light output controller, the configurable light output controller having
      i) an input interface, coupled with the vision processor, for receiving the trigger input signals generated by the vision processor,
      ii) an output interface, coupled with the light source, for providing the trigger output signal to the light source,
      iii) a storage device for storing the lighting program, and
      iv) a processor, for executing the lighting program to generate the trigger output signal in response to the trigger input signals received by the input interface,
   wherein the trigger input signals belong to input trigger groups, and
   wherein the trigger output signal is based, in part, on one of the input trigger groups to which one of the trigger input signals belongs.

7. The system of claim 6 wherein each of the input trigger groups includes a sequence of trigger input signals, and
   wherein the trigger output signal is based, in part, on a sequence number of the one of the trigger input signals.

8. The system of claim 6 wherein the configurable light output controller further includes a control program interface for accepting a lighting program from the external source.

9. The system of claim 8 wherein the control program interface is for providing the stored lighting program to the external source.

10. The system of claim 8 wherein the external source is a program input terminal.

11. The system of claim 10 wherein the program input terminal is a personal computer.

12. The system of claim 10 wherein the program input terminal is a computer.

13. The system of claim 10 wherein the program input terminal includes a lighting program generation application.

14. The system of claim 13 wherein the lighting program generation application presents a template for creating a lighting program.

15. The system of claim 13 wherein the lighting program generation application presents a template for editing a lighting program.

16. A system comprising:
   a) a vision processor for generating trigger input signals;
   b) a light source which fires in response to a received trigger output signal;
   c) an external source for providing a lighting program; and
   d) a configurable light output controller, the configurable light output controller having
      i) an input interface, coupled with the vision processor, for receiving the trigger input signals generated by the vision processor,
      ii) an output interface, coupled with the light source, for providing the trigger output signal to the light source,
      iii) a storage device for storing the lighting program, and
      iv) a processor, for executing the lighting program to generate the trigger output signal in response to the trigger input signals received by the input interface,
   wherein each of the trigger signals generated by the vision processor are assigned to one of a plurality of links to the configurable light output controller, such that each of the plurality of links provides a sequence of trigger signals, and
   wherein the lighting program specifies an output trigger signal set based on the one of the plurality of links upon which a trigger signal is provided and based on a sequence number of the trigger signal.

17. The system of claim 16 wherein the plurality of links are physically distinct links such that the trigger signals generated by the vision processor are space division multiplexed onto the plurality of links.

18. The system of claim 16 wherein the plurality of links are defined as distinct time slots on a single physical link such that the trigger signals generated by the vision processor are time division multiplexed onto the single physical link.

19. The system of claim 16 wherein the plurality of links are defined as distinct frequency bands on a single physical link such that the trigger signals generated by the vision processor are frequency division multiplexed onto the single physical link.

20. A method for generating output trigger signals, for firing one or mote light sources, from input trigger signals generated by a vision processor, the method comprising steps of:
   a) accepting the input trigger signals from the vision processor;
   b) determining output triggers in response to the input trigger signals based on a stored lighting program; and
   c) generating the output trigger signals based on the determined output triggers
   wherein each of the input trigger signals is assigned to a particular one of a plurality of trigger groups such that each of the plurality of trigger groups may be provided with a sequence of input trigger signals.

21. The method of claim 20 wherein the step of determining output triggers includes sub-steps of
   i) determining the one of the plurality of trigger groups to which a received input trigger signal belongs,
   ii) determining a sequence number of the received input trigger signal within the one of the plurality of trigger groups, and
   iii) determining an output trigger group based on the determined one of the plurality of trigger groups and based on the determined sequence number.

* * * * *